US008660996B2

(12) United States Patent (10) Patent No.: US 8,660,996 B2
Darcy (45) Date of Patent: Feb. 25, 2014

(54) MONITORING FILES IN CLOUD-BASED NETWORKS

(75) Inventor: Jeffrey Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 688 days.

(21) Appl. No.: 12/893,388

(22) Filed: Sep. 29, 2010

(65) Prior Publication Data

US 2012/0078946 A1 Mar. 29, 2012

(51) Int. Cl.
*G06F 7/00* (2006.01)
*G06F 17/00* (2006.01)

(52) U.S. Cl.
USPC .......................................................... 707/690

(58) Field of Classification Search
USPC .......................................................... 707/690
See application file for complete search history.

(56) References Cited

U.S. PATENT DOCUMENTS

| 2001/0025284 | A1* | 9/2001 | Seol et al. | 707/203 |
| 2002/0188667 | A1* | 12/2002 | Kirnos | 709/203 |
| 2005/0091287 | A1* | 4/2005 | Sedlar | 707/200 |
| 2005/0283489 | A1* | 12/2005 | Shiozawa et al. | 707/100 |
| 2010/0218037 | A1* | 8/2010 | Swartz et al. | 714/6 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010.
Jeffrey Darcy, "Systems and Methods for Searching a Cloud-Based Distributed Storage Resources Using a Set of Expandable Probes", U.S. Appl. No. 12/893,737, filed Sep. 29, 2010.
James Michael Ferris, "Systems and Methods for Generating Optimized Host Placement of Data Payload in Cloud-Based Storage Network", U.S. Appl. No. 13/118,075, filed May 27, 2011.
Jeffrey Darcy, "Systems and Methods for Dynamically Replicating Data Objects Within a Storage Network", U.S. Appl. No. 12/872,022, filed Aug. 31, 2010.
James Michael Ferris, "Systems and Methods for Stage Data Migration Between Data Sources and Cloud-Based Storage Network", U.S. Appl. No. 13/037,183, filed Feb. 28, 2011.
James Michael Ferris, "Systems and Methods for De-Populating Cloud Data Storage", U.S. Appl. No. 13/036,977, filed Feb. 28, 2011.
James Michael Ferris, "Systems and Methods for Migrating Data Among Cloud-Based Storage Networks Via a Data Distribution Service", U.S. Appl. No. 13/037,215, filed Feb. 28, 2011.
James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.

(Continued)

*Primary Examiner* — Mahesh Dwivedi
*Assistant Examiner* — Kris Mackes
(74) *Attorney, Agent, or Firm* — Lowenstein Sandler LLP (57) ABSTRACT

Embodiments relate to systems and methods for monitoring files in cloud-based networks. In particular, a file managing module can manage the access and retrieval of files stored in cloud-based networks on a distributed basis. In embodiments, the file managing module can receive a file access request from a requesting entity. The file managing module can use the file access request to determine a storage location mapped to a hash structure. Generation numbers associated with the both the storage location and the actual file at the storage location can be compared to determine whether the file has been unexpectedly modified or relocated. The file managing module can sync any discrepancy between the generation numbers and retrieve the file for the requesting entity.

18 Claims, 7 Drawing Sheets

(56) References Cited

OTHER PUBLICATIONS

James Michael Ferris, "Systems and Methods for Establishing Upload Channels to a Cloud Data Distribution Service", U.S. Appl. No. 13/037,230, filed Feb. 28, 2011.

James Michael Ferris, "Methods and Systems to Automatically Extract and Transport Data Associated with Workload Migrations to Cloud Networks", U.S. Appl. No. 13/116,599, filed May 26, 2011.

James Michael Ferris, "Systems and Methods for Cloud Data Deployment Based on Preferential and/or Existing Subscription Relationships", U.S, Appl. No. 13/117,331, filed May 27, 2011.

James Michael Ferris, "Methods and Systems for Data Compliance Management Associated with Cloud Migration Events", U.S. Appl. No. 13/118,123, filed May 27, 2011.

James Michael Ferris, "Systems and Methods for Determining Consistencies in Staged Replication Data to Improve Data Migration Efficiency in Cloud Based Networks", U.S. Appl. No. 13/117,235, filed May 27, 2011.

\* cited by examiner

FIG. 6

MONITORING FILES IN CLOUD-BASED NETWORKS

FIELD

The present teachings relate to systems and methods for monitoring files in cloud-based networks, and more particularly to platforms and techniques for ensuring the accuracy of a file location mapped to a hash structure in a cloud-based network before retrieving the file.

BACKGROUND OF RELATED ART

Hash structures are used in computer systems to map identifying values, or keys, to their associated values. A hash function is used to transform the key into the index of an array element where the associated value is stored. When items in the hash structure are removed or deleted, the hash structure undergoes a rehash whereby existing items in the hash structure are mapped to new locations. Hash structures can be used in cloud-based networks whereby key-to-value mappings are stored in resources associated with the cloud-based network.

"Consistent hashing" can be implemented such that the addition or removal of one slot does not significantly change the mapping of keys to locations. In particular, consistent hashing involves associating a real angle to items to effectively map the item to, for example, a point on the edge of a circle. In addition, available machines or servers are mapped to locations around the circle. The machine or server on which the item is to be stored is chosen by selecting the machine at the next highest angle along the circle after the item. If a storage location on the machine becomes unavailable, then the angles mapping to the location are removed and requests for files that would have mapped to the unavailable location are now mapped to the next available storage location.

However, consistent hashing can be problematic in situations in which a user or computer program requests to access a file that has been moved, renamed, or deleted without the user or computer program having the necessary data to determine the change. As such, finding and accessing the file can take more time and can lead to system hardware or software problems, faults, or other errors. Further, hashing in cloud-based networks can be problematic when multiple entities have access to move, rename, or delete files stored on devices of the cloud-based network.

Therefore, it may be desirable to provide systems and methods for monitoring files in cloud-based networks. In particular, it may be desirable to ensure the accuracy of a file location mapped to a hash structure in a cloud-based network before retrieving the file.

DESCRIPTION OF EMBODIMENTS

Embodiments of the present teachings relate to systems and methods for monitoring files in cloud-based networks. In particular, embodiments relate to platforms and techniques for ensuring the accuracy or validity of a file location mapped to a hash structure in a cloud-based network prior to retrieving or accessing the file. The hash structure in combination with the cloud-based network can allow for a distributed system of file storage and retrieval. For example, an operator of the cloud-based network can insert files into available resources of the cloud on a dynamic and/or distributed basis while using the hash structure to maintain locations of the files. In embodiments, users or computer hardware or software can request access to the file mapped to the hash structure. Specifically, a memory address of the file can be allocated to a storage device that is also mapped to the hash structure. Further, the users can be a set of end users accessing, via a set of instantiated virtual machines in a cloud-based network, files associated with application or product resources provided by one or more vendors, such as independent service vendors (ISVs).

Embodiments described herein can be implemented in or supported by a cloud network architecture. As used herein, a "user" can refer a person, customer, subscriber, administrator, corporation, organization, or other entity accessing files and/or devices storing the files in the cloud-based network. In embodiments, the user can operate or manage computer software or hardware that can access files and/or devices storing the files in the cloud-based network. Further, as used herein, a "cloud" can comprise a collection of resources that can be invoked to instantiate a virtual machine, process, or other resource for a limited or defined duration.

As used herein, the "resources" can be hardware such as, for example, servers, device drivers, storage such as hard drives, virtual memory, databases, random access memory (RAM) and other memory, processors, multimedia cards, and the like, in the cloud-based network. The resources can be accessed by users or by software or applications independent from or associated with resources of the cloud-based network. In embodiments, vendors such as ISVs can supply software resources for use with other resources in a cloud-based network. Resources in the cloud-based network can include any hardware, software, or communications resources, such as ports or channels provided to a virtual machine or other machine or process in the cloud. Resources can likewise include services, such as Web-based services deployed in the cloud, for example security or identity management services and/or other resources.

As used herein, a "hash structure" can be any data structure that uses a hash function to map keys to their associated values. In embodiments, the associated values can comprise an address location of a file stored on an associated storage device. In embodiments, one or more hash structures can be implemented in any resource of a cloud-based network, or can comprise values pointing to files associated with the resources of the cloud-based network. Further, in embodiments, the one or more hash structures can be implemented as a consistent hashing scheme whereby the address locations are mapped and allocated to mapped resources. One or more users or entities can access the hash structures to overwrite, change, delete, or otherwise modify keys or values associated with the hash structures. It should be appreciated that numerous hash functions can be employed to map keys to the associated values. In embodiments, the hash structures can be employed in one or more cloud-based networks.

Figure 1:
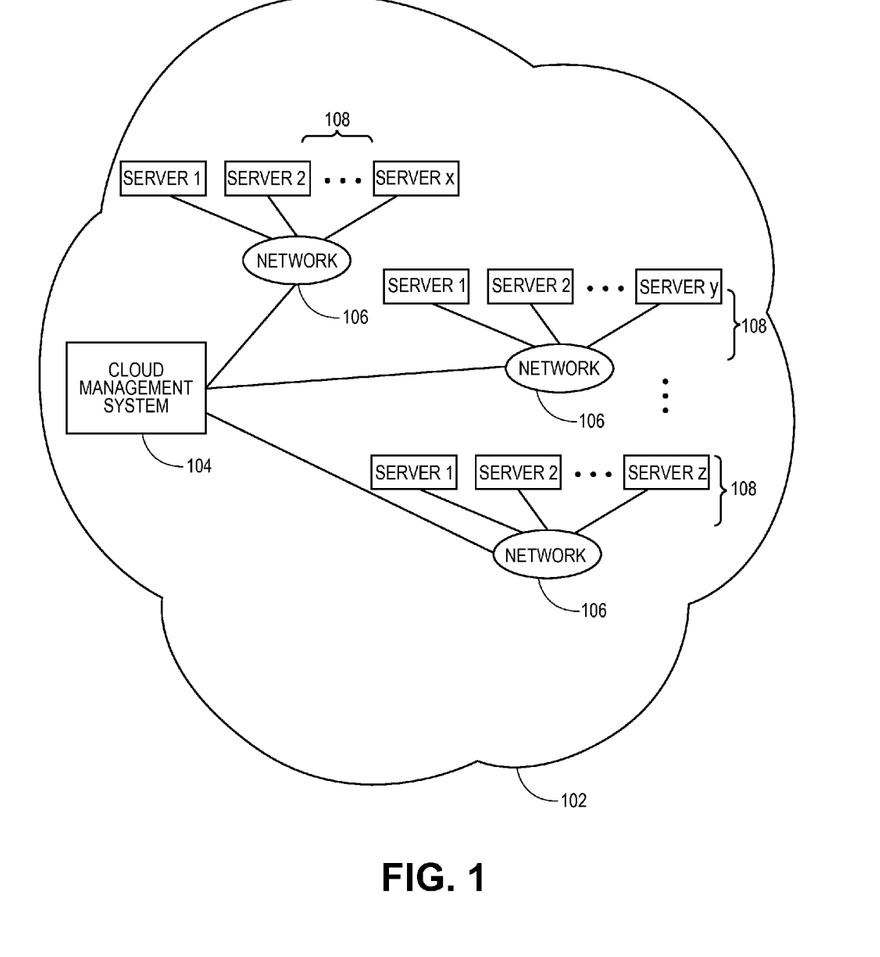
FIG. 1 illustrates an overall cloud system architecture in which various embodiments of the present teachings can be practiced; managing file modifications

FIG. 1 illustrates an overall cloud system architecture in which various embodiments of the present teachings can be practiced. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
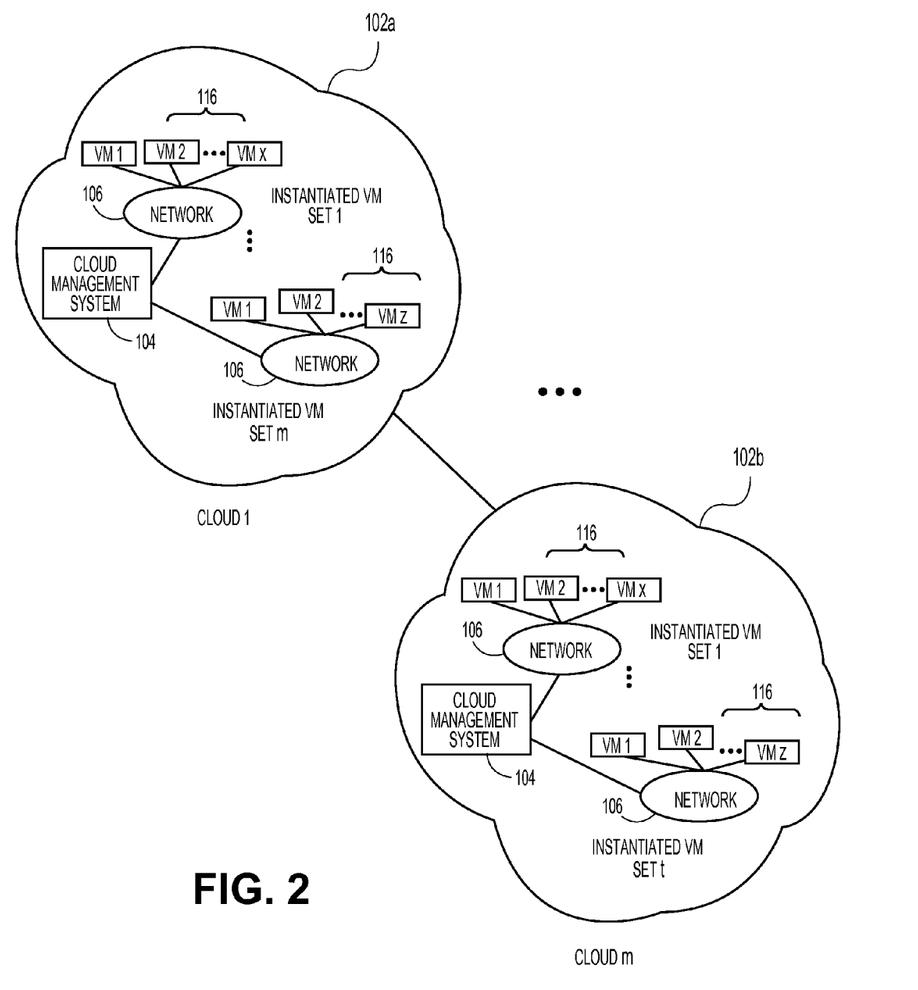
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102a, 102b or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102a, 102b. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102a, 102b can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102a, 102b hosting multiple sets of virtual machines. Each of the individual sets of virtual machines can be hosted in a respective partition or sub-cloud of the resources of the main cloud 102a, 102b. The cloud management system 104 of a cloud can for example deploy services specific to isolated or defined sub-clouds, or isolate individual workloads/processes within the cloud to a specific sub-cloud. The subdivision of the cloud 102a, 102b into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102a can also interact with a set of instantiated virtual machines or processes generated in a second, third or further cloud 102b. Further, the cloud management system 104 of the first cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3A:
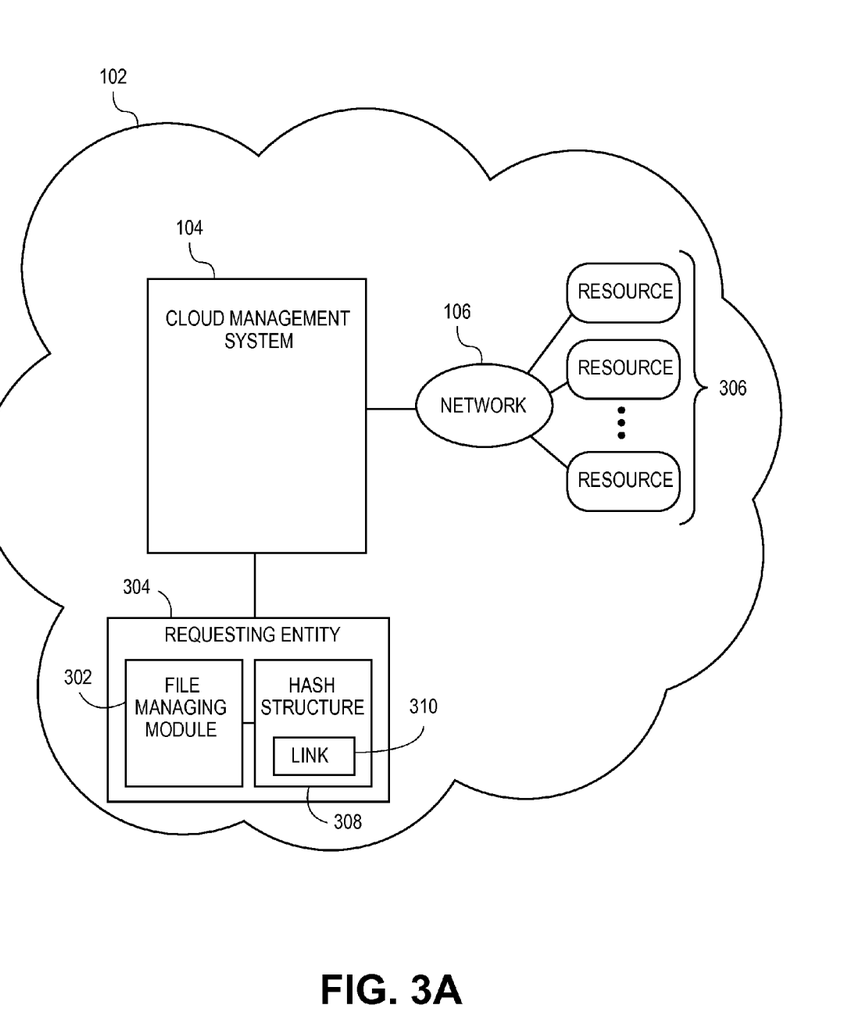
FIG. 3A illustrates an exemplary network configuration that can be used in systems and methods for monitoring files in cloud-based networks, according to various embodiments.

FIG. 3A illustrates an exemplary network configuration that can be used in systems and methods for monitoring in cloud-based networks. In embodiments as shown, the cloud management system 104 can interface with a requesting entity 304, and with a set of resources 306 of the cloud 102 via the network 106. The requesting entity 304 can request files stored on the set of resources 306 of the cloud 102. In embodiments, the set of resources 306 can be servers, virtual machines, or other storage resources associated with the cloud 102. The requesting entity 304 can comprise a file managing module 302 that can be configured to interface with a hash structure 308 that can map keys to their associated values. In embodiments, candidate storage locations of files stored on the set of resources 306 can be mapped on the hash structure 308. Further, in embodiments, the hash structure 308 can be implemented using consistent hashing, although other hashing techniques and structures are envisioned. An operator of the cloud 102 can insert files into any available resource 306 on a dynamic and/or distributed basis while using the hash structure 308 to maintain locations of the files.

It should be appreciated that the hash structure 308 or a copy thereof can be implemented or stored on other resources of cloud 102 such as, for example, the cloud management system 104. It should further be appreciated that the file managing module 302 can be implemented on other hardware and/or software components configured to interface with the other components and entities described herein. Further, it should be appreciated that the file managing module 302 can be configured to interface with additional clouds (not shown in figures) and associated resources, such as virtual machines, of the additional clouds.

In embodiments, the requesting entity 304 can be a user, owner, administrator, company, software program or application, or other entity or resource who can submit a request to access or retrieve a file stored on the set of resources 306 of the cloud 102. For example, a user can submit a file request to access or retrieve a file stored on a virtual machine 116 in the cloud 102. In embodiments, the file managing module 302 can determine, from the file request, a candidate storage address for the file that can be mapped to the hash structure 308 and allocated to a resource 306 also mapped to the hash structure 308. The file managing module 302 can be configured to communicate with the cloud management system 104, the set of resources 306, the hash structure 308, and/or other resources of the cloud 102.

According to the present embodiments, the file managing module 302 can monitor a file via a file link 310 mapped on the hash structure 308. In embodiments, the file link 310 can point to a storage location of the resources 306 on which the files are stored, such as for example, a uniform resource locator (URL). Further, the resources 306 themselves can be mapped to the hash structure 308. In embodiments, each of the file links 310 mapped on the hash structure 308 as well as the files themselves can comprise a generation number to indicate a location update history of the associated file. In embodiments, the generation number can be a tag, value, indicator, comment, note, or the like associated with the file. For example, the generation numbers of the file link 310 and of the associated file can be a counter that can be incremented any time the associated file is modified or relocated. It should be appreciated that the generation numbers can comprise additional information associated with modifications to and relocations of the file. As used herein, a "modification" can refer to an access, revision, alteration, encoding, decoding, duplication, or any other change that can occur to a file. Further, as used herein, a "relocation" can refer to any time a file is moved to or saved in a new location on the same or different resource.

In embodiments, the file managing module 302 can append the generation number to the file link 310 that is mapped on the hash structure 308, and to the actual file that is stored on one of the resources 306. In embodiments, the file managing module 302 can read from and write to the generation numbers associated with any files. Further, in embodiments, the file managing module 302 can compare the generation numbers to determine if a file at a storage location on an associated resource 306 has been modified or relocated by an entity other than itself. For example, a file may have been modified or relocated by an entity other than the requesting entity 304 if there is an inconsistency between the generation number of the file link mapped to the hash structure 308 and the generation number of the associated file. In embodiments, the modification or relocation may have occurred without the file managing module 302 having the necessary data to determine that the file had been modified or relocated. In embodiments, the examination of the generation numbers can reduce "false positive" hashes in which the file managing module 302 retrieves a replacement file that the file managing module 302 expects to be the actual valid file requested by the requesting entity 304.

In embodiments, the file managing module 302 can use the hash structure 308 to employ a consistent hashing system to map the file links 310 corresponding to memory addresses of files stored on the set of resources 306 in the cloud 102. Further, the consistent hashing system can map the resources 306 on which the files are stored. For example, the consistent hashing system can employ a mathematical mapping space used in conjunction with a mathematical relationship to locate memory addresses of requested files and associated resources. In embodiments, the hash structure 308 can be any mapping space in which files and resources can be mapped, such as, for example, a circle with a specified radius, a two-dimensional space of real numbers, a line, a three-dimensional space of real numbers, an ellipse, a three-dimensional sphere, or other spaces. In embodiments, the mapping of the file links 310 and resources in the hash structure 308 can be accomplished with a hash function as conventionally understood. For example, the hash function can receive a key input and map the key input to an array element where the corresponding value is to be sought. In embodiments, the corresponding value can be the file link 310 comprising a memory address or storage location for one of the set of resources 306 on which a requested file is stored.

In operation, the file managing module 302 can examine a file access request from the requesting entity 304 to determine the file link 310 mapped to the hash structure 308. For example, the file managing module 302 can use an algorithm to generate an input key for the hash function of the hash structure 308 based on a name of the file. The associated value can be the file link 310 for a candidate storage location in which the file is stored. It should be appreciated that other key generation and value determination algorithms are envisioned. In embodiments, the file link 310 can comprise a generation number. In further embodiments, the node mapped to the hash structure 308 can be the requested file itself.

The file link 310 can be allocated to one of the set of resources 306 also mapped to the hash structure 308 based on a mathematical relationship between the file link 310 and the resource 306 in the mapping space. For example, the file link 310 can be allocated to the resource 306 using consistent hashing. The file managing module 302 can follow the file link 310 to the candidate storage location. If the candidate storage location contains an additional link, the file managing module 302 can follow the additional link and any subsequent links until reaching the actual file. Further, if the file managing module 302 has to follow additional links, the file managing module 302 can be configured to update the original file link 310 mapped to the hash structure 308 to point directly to where the actual file can be found. In embodiments, the file managing module 302 can be configured to search for a file if the file link 310 is null or broken, and can update the file link 310 if the original file is found.

Once the file is found, the file managing module 302 can examine a generation number associated with the file, and compare the file generation number to the generation number of the file link 310 mapped to the hash structure 308. If the generation numbers are consistent, or, in other words, if the file has not been unexpectedly modified or relocated, the file managing module 302 can retrieve the file and utilize the file as necessary. In contrast, if the generation numbers are not consistent, or, in other words, the file has unexpectedly been modified or relocated, the file managing module 302 can update the file link 310 mapped to the hash structure 308 to, for example, sync the generation numbers. In embodiments, the file managing module 302 can notify the requesting entity 304 of any unexpected file modification or relocation. Therefore, the requesting entity 304 can be notified or can detect on a next access that a file access or retrieval can be hazardous to operation of any associated hardware or software. In other embodiments, the file managing module 302 can retrieve and utilize the file even though the file has been unexpectedly modified or relocated.

For example, assume a financial management software application needs to access a spreadsheet file that is stored on a device in a cloud network. The software application can submit a request comprising the name of the spreadsheet file to the file managing module 302, which can use the name of the spreadsheet file as a key input to the hash structure 308. The name of the spreadsheet file can map, via a hash function, to a candidate storage location in which the spreadsheet file is stored. The file managing module 302 can determine which resource 306 to which the storage location is allocated and follow the storage location to access the spreadsheet file. The storage location can comprise a generation number that, when compared to a generation number of the actual spreadsheet file, can indicate whether the spreadsheet file at the corresponding storage location has been unexpectedly modified or relocated. If the spreadsheet file has been unexpectedly modified or relocated, the file managing module 302 can notify the software application that the spreadsheet file may be the wrong version. However, if a comparison of the generation numbers indicates that the spreadsheet file is valid, the file management module 302 can retrieve the spreadsheet file for the software application.

Figure 3B:
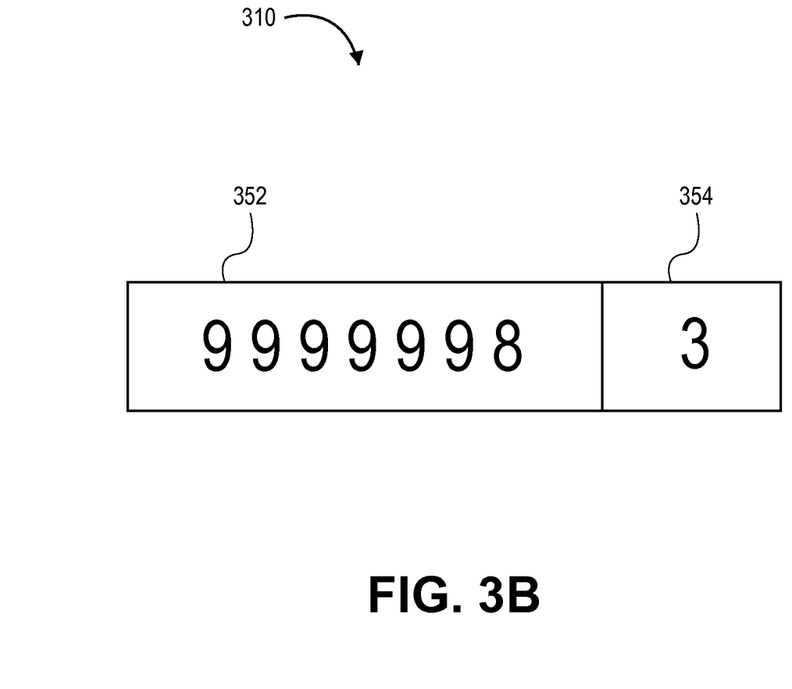
FIG. 3B illustrates an exemplary file link mapped to a hash structure, according to various embodiments.

Referring to FIG. 3B, illustrated is an exemplary file link 310 according to various embodiments. The file link 310 can correspond to a file and can be mapped to a hash structure, for example using consistent hashing. The file link 310 can comprise a memory address 352 and a generation number 354. In embodiments, the generation number 354 can be appended to the memory address 352, as shown in FIG. 3B. However, it should be appreciated that the generation number 354 can be stored with the memory address 352 in any way. The memory address 352 can specify the storage location in which the corresponding file is stored. In embodiments, the storage location can be allocated to a resource also mapped to the hash structure, as discussed herein.

As shown in FIG. 3B, the generation number 354 can be an integer corresponding to the number of times the corresponding file stored at the memory address 352 has been relocated, modified, replaced, deleted, and/or the like. For example, as shown in FIG. 3B, the generation number 354 is "3," which can indicate that the file stored at memory address 352 has been relocated a total of the three (3) times. It should be appreciated that although FIG. 3B depicts the generation number 354 as an integer, the generation number 354 can be anything that can indicate when, how, or by what entity a file is modified or relocated. In embodiments, the actual file can comprise a similar generation number that can be used to determine if the file has been unexpectedly modified or relocated, as discussed herein.

Figure 4A:
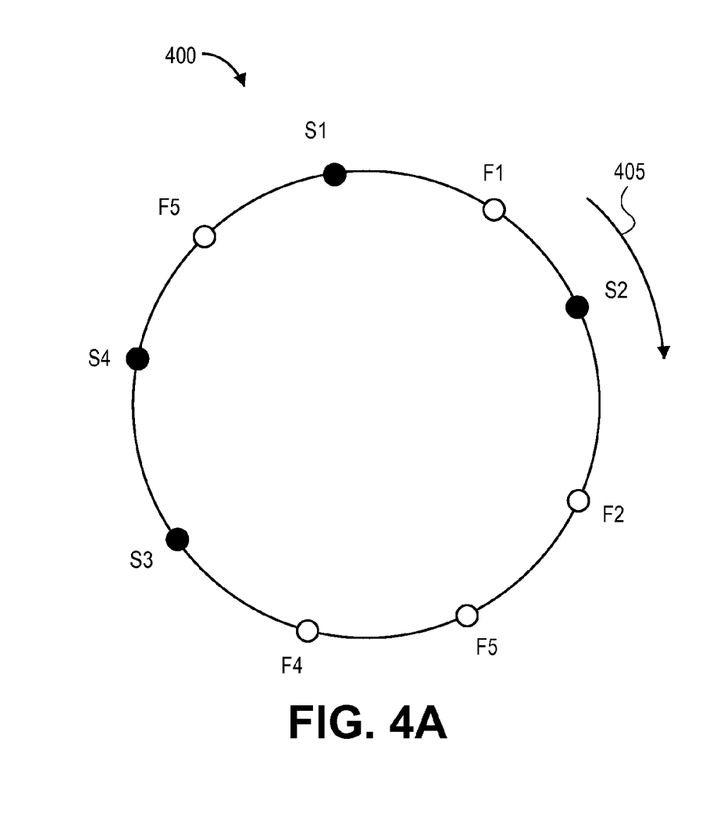
FIG. 4A illustrates an exemplary mathematical space used to allocate files to resources using consistent hashing, according to various embodiments.
Figure 4B:
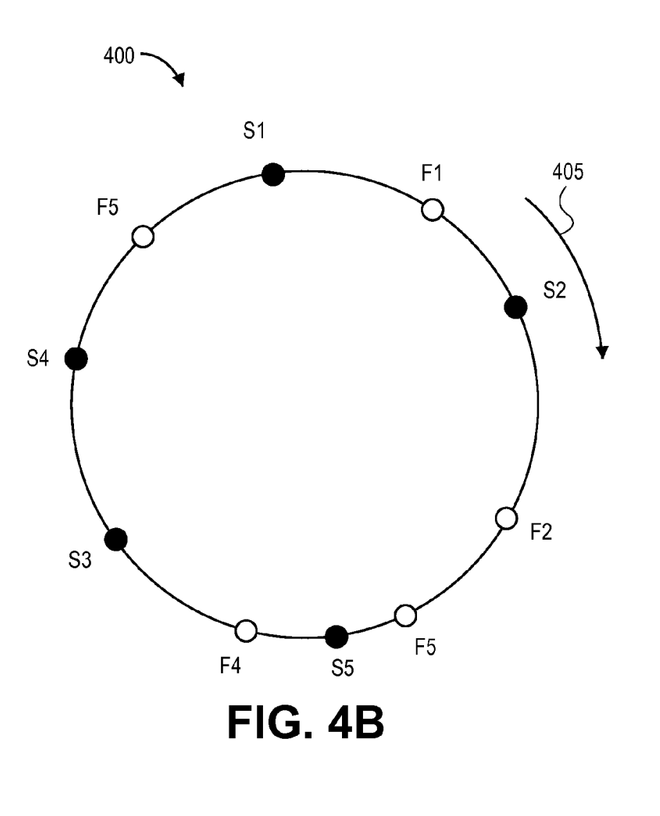
FIG. 4B illustrates an exemplary mathematical space used to allocate files to resources using consistent hashing, according to various embodiments.

Referring to FIGS. 4A and 4B, depicted is a exemplary mathematical space 400 used to allocate files to resources using consistent hashing. As shown in FIGS. 4A and 4B, the mathematical space 400 can be a circle with a radius of 1, however, it should be appreciated that the mathematical space 400 can comprise different spaces. The mathematical space 400 can comprise files and a plurality of servers mapped to points on the circle using a hash function. For example, as shown in FIG. 4A, files F1-F5 and servers S1-S4 are mapped as points on the circle of the mathematical space 400. Further, each of the files F1-F5 is allocated to the closest server S1-S4 moving clockwise around the circle, as indicated by arrow 405. For example, file F5 is allocated to server S1, file F1 is allocated to server S2, and files F2-F4 are allocated to server S3.

FIG. 4B depicts the mathematical space 400 after a server S5 is added. As shown in FIG. 4B, the only documents that are reallocated are those now closest to the server S5 going clockwise 405 around the circle. As such, only files F2 and F3 are reallocated to server S5, and files such as F4 remain allocated to server S3. As a result, consistent hashing reduces the amount of reallocation necessary when resources are added or removed.

According to the present embodiments, each of files F1-F5 can be a storage location of a file stored on one of servers S1-S4 and can comprise a generation number to indicate a version number or update history of the stored file, as discussed herein. As such, a user or program accessing files F1-F5 can examine the attributes of the generation number to determine an access and modification history of the stored file. For example, a user can request a file allocated to a server and determine through the generation number that the file was modified by another user or entity. For further example, a program can request a file mapped to a specific location and determine through the updated version tag that what is at the specific location is actually a different file that replaced the original file requested. Therefore, the program can determine that the different file is not the file originally intended, and can generate a notification indicating the same. It should be appreciated that other options for handing unexpected files are envisioned such as, for example, retrieving the file as-is, terminating an associated program, replacing the accessed file with a different file, and other options.

Figure 5:
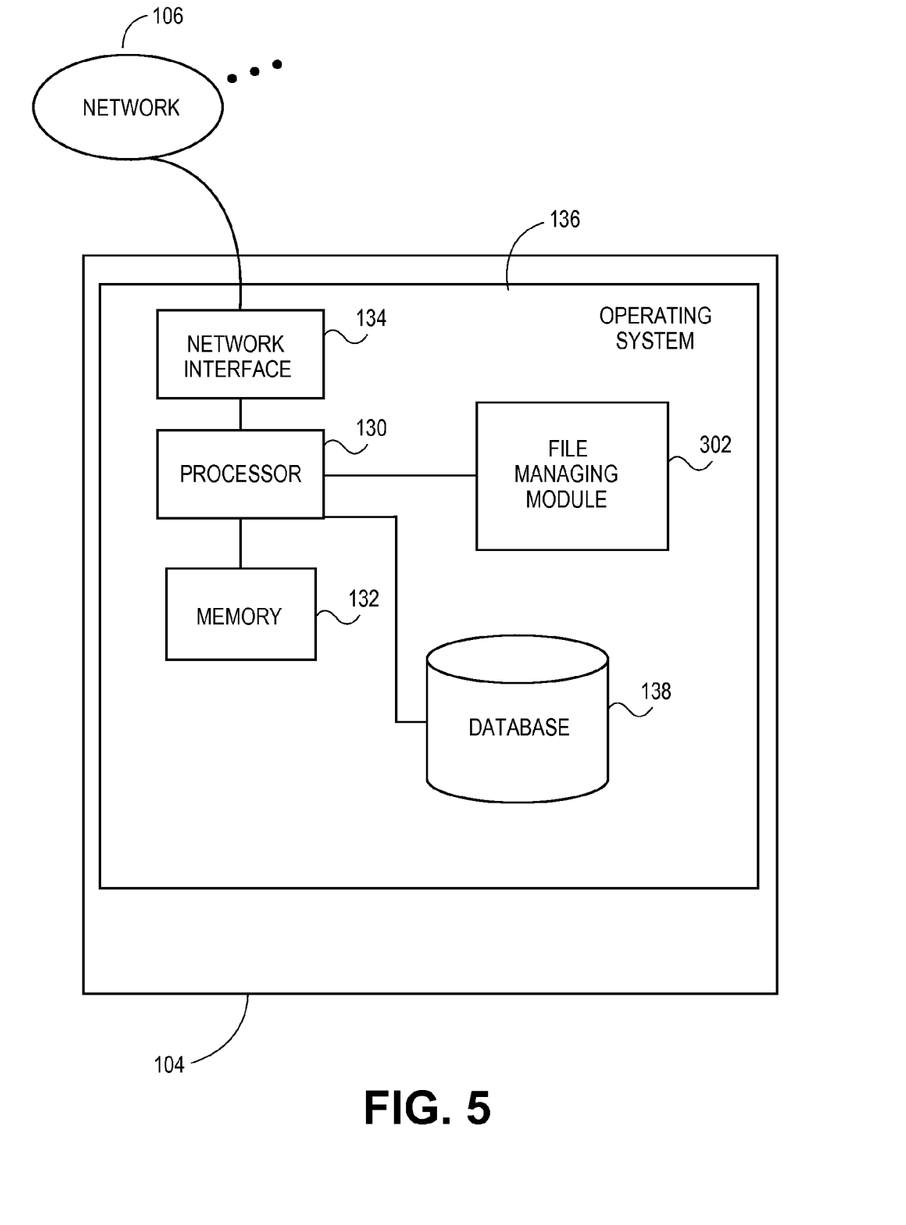
FIG. 5 illustrates an exemplary hardware configuration for a cloud-based management system, according to various embodiments.

FIG. 5 illustrates an exemplary diagram of hardware and other resources that can be incorporated in a cloud management system 104 configured to communicate with a set of instantiated virtual machines 116 (as shown in FIG. 2) via one or more networks 106, according to embodiments. In embodiments as shown, the cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer readable storage medium 138 and the file managing module 302, to execute control logic, manage the file histories of files stored in the cloud 102 as described herein, and control the operation of virtual machines and other resources in cloud 102. Other configurations of cloud management system 104, associated network connections, and other hardware and software resources are possible.

Figure 6:
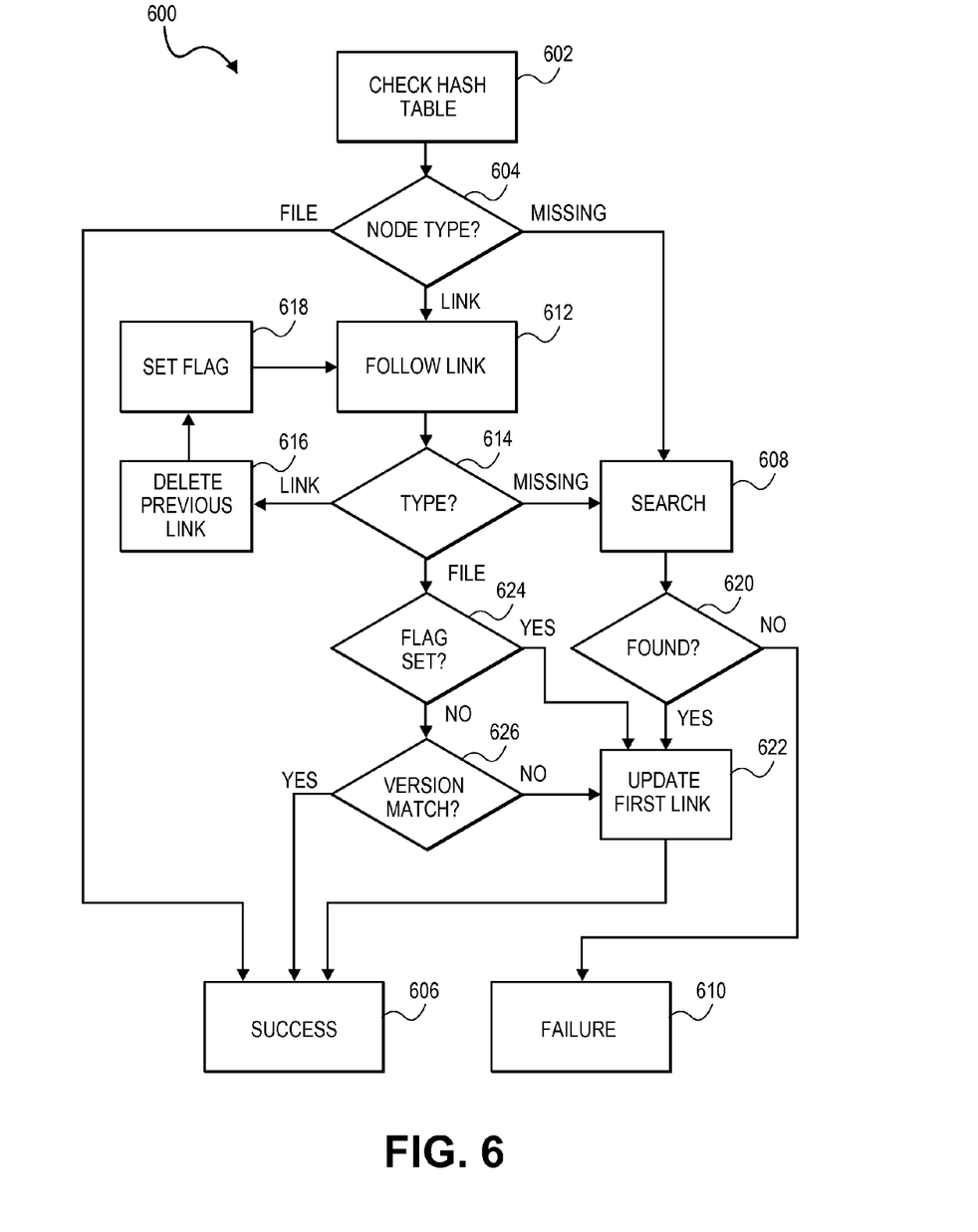
FIG. 6 illustrates a flowchart for monitoring files in cloud-based networks, according to various embodiments.

FIG. 6 illustrates a flowchart for overall file modification management in a cloud computing environment, according to various embodiments. In embodiments, the file storage and retrieval can occur on a distributed basis in a cloud-based network, and file locations and associated resources can be mapped on a hash structure using consistent hashing, as described herein. In 602, a hash structure can be checked in response to receiving a file access request from an entity. In embodiments, the entity can be a user or a software application or program. Further, in embodiments, the file managing module 302 can use an algorithm to transform, for example, a file name, into an input key for a hash structure, and a resulting node on the hash structure can be the value associated with the key.

In 604, the file managing module 302 can determine the type of node mapped to the hash structure resulting from checking the hash structure. If the node is a file, such as the file requested by the entity, the processing can proceed to a success condition 606 in which, for example, the file can be retrieved and provided to the requesting entity. In embodiments, the file can be a document, executable file, configuration file, application file, or any other type of file. In embodiments, the file can be retrieved and implemented, executed, distributed, or otherwise accessed by the requesting entity.

If the node is null, processing can proceed to 608 in which a search for the requested file can be conducted. In embodiments, the file managing module 302, another entity, or other processes, operations, or logic can search local or remote memory, storage, or the like to attempt to locate the requested file or a link to the requested file. If the node is a link, processing can proceed to 612 in which the link can be followed. In embodiments, the link can comprise a generation number that can indicate, for example, when or how many times the file has been modified or relocated, as described herein. In embodiments, the node can be a link to a storage location on a computer, a server, a virtual machine, or another resource in the cloud-based network. In further embodiments, the storage location can be allocated to a resource determined through consistent hashing methods and algorithms, as discussed herein.

In response to following the link to the storage location in 612, the resulting storage location can be examined in 614. If the resulting storage location comprises another link, processing can proceed to 616 in which the previously-accessed link can be deleted. In 618, a flag can be set that can indicate that the previously-accessed link has been deleted. In embodiments, the flag can be set by an application performing the processing of FIG. 6. After the flag is set, processing can proceed back to 612 in which the new link is followed. Alternatively, if the resulting storage location is null, processing can proceed to 608 in which a search for the requested file can be conducted. Further, alternatively, if the resulting storage location comprises a file, processing can proceed to 624 in which the file managing module 302 or another entity can determine if the flag in the application has been set.

If the flag has not been set, processing can proceed to 626 in which the file managing module 302 or another entity can access the file and determine if the file is the correct version expected by the requesting entity. In embodiments, a generation number associated with the file can be examined to determine, for example, when or how many times the file has been modified or relocated, as described herein. In embodiments, the file managing module 302 can compare the generation number of the link to the generation number of the file to determine whether the file has been unexpectedly modified or relocated. In embodiments, the determination can conclude whether the file has been modified or relocated by a user, computer, server, application, or entity other than the entity originally requesting the file. Further, in embodiments, the determination can conclude whether the file has been modified or relocated without the entity originally requesting the file having the necessary information to determine that the file was modified or relocated. In further embodiments, the determination can prevent the occurrence of "false positives," in which the file managing module 302 retrieves a replacement file that the file managing module expects to be the actual valid file requested by the requesting entity.

Upon the determination, if the generation numbers do not match, processing can proceed to 622 in which the file managing module 302 or another entity can update the original link mapped to the hash structure by, for example, syncing the generation number of the link with the generation number of the file. In embodiments, the file managing module 302 or other entity can generate a notification to the requesting entity that the file versions do not match, at which point the requesting entity or other entity can choose whether to retrieve the file anyway, not retrieve the file, terminate the application, or the like. If the file version does match, processing can proceed to 606 in which the file can be retrieved and provided to the requesting entity.

Referring back to 624, if the flag has been set, processing can proceed to 622 in which the file managing module 302 or another entity can update the original link that is mapped to the hash structure. In embodiments, the original link can be modified to point to the storage location in which the file is located. Further, referring back to the file search of 608, the file managing module 302 or other entity can determine if the file is found, in 620. If the file is found, processing can proceed to 622 in which the original link can be updated, as described herein. After updating the original link, processing can proceed to the success condition 606 in which the file can be retrieved for the requesting entity.

If the file is not found, processing can proceed to a failure condition, 610. In embodiments, a notification that the file cannot be located can be generated. For example, the notification can be a message to the entity requesting the file. It should be appreciated that other responses to a missing file are envisioned such as, for example, providing the requesting entity a default file, and other responses.

The foregoing description is illustrative, and variations in configuration and implementation may occur to persons skilled in the art. For example, while embodiments have been described which operate using one file managing module 302 and associated cloud management system 104, in embodiments, one or more of file managing module 302 and associated cloud management system 104, and/or other servers, data stores, and/or other logic or resources can be used. For further example, while embodiments have been described in which files associated with cloud resources are monitored, in embodiments, the files can be monitored at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   receiving, by a processor at a requesting entity, a request to access a file in a cloud-based network, wherein the request comprises an identifier of the file;
   identifying a value in a hash structure at the requesting entity using the identifier of the file as a key into the hash structure, wherein the value comprises an initial link to a candidate storage location of the file in the cloud-based network, and wherein the initial link comprises a first generation number;
   following the initial link to the candidate storage location in the cloud-based network, wherein the candidate storage location in the cloud-based network comprises an additional link;
   following the additional link to an actual storage location of the file in the cloud-based network to access the file and examine a second generation number associated with the file;
   updating the initial link in the value in the hash structure to point to the actual storage location of the file;
   comparing the first generation number to the second generation number to determine whether the file has been relocated or modified by an entity other than the requesting entity; and
   wherein the first generation number and the second generation number are counters that are incremented as the file is modified or relocated.

2. The method of claim 1, further comprising:
   determining that the first generation number does not match the second generation number;
   updating the first generation number in the initial link in response to determining that the first generation number does not match the second generation number; and
   retrieving the file from the actual storage location in response to determining that the first generation number does not match the second generation number.

3. The method of claim 1, further comprising:
   determining that the first generation number does not match the second generation number;
   updating the first generation number in the initial link in response to determining that the first generation number does not match the second generation number; and
   generating a notification indicating the mismatch in response to determining that the first generation number does not match the second generation number.

4. The method of claim 3, wherein updating the first generation number in the initial link comprises replacing the first generation number in the initial link with the second generation number.

5. The method of claim 3, wherein a relocation of the file causes the first generation number to not match the second generation number.

6. The method of claim 3, wherein a modification of the file causes the first generation number to not match the second generation number.

7. The method of claim 1, wherein identifying the value comprises utilizing consistent hashing to identify a storage device to which the candidate storage location is allocated.

8. The method of claim 1, further comprising:
   determining that the first generation number matches the second generation number; and
   retrieving the file from the actual storage location in response to determining that the first generation number matches the second generation number.

9. A system comprising:
   an interface, at a requesting entity, to receive a request to access a file in a cloud-based network; and
   a processor, at the requesting entity, to communicate with the interface to:
   identify a value in a hash structure at the requesting entity using the identifier of the file as a key into the hash structure, wherein the value comprises an initial link to a candidate storage location of the file in the cloud-based network, and wherein the initial link comprises a first generation number;
   follow the initial link to the candidate storage location in the cloud-based network, wherein the candidate storage location in the cloud-based network comprises an additional link;
   follow the additional link to an actual storage location of the file in the cloud-based network to access the file and examine a second generation number associated with the file;
   update the initial link in the value in the hash structure to point to the actual storage location of the file;
   compare the first generation number to the second generation number to determine whether the file has been relocated or modified by an entity other than the requesting entity; and
   wherein the first generation number and the second generation number are counters that are incremented as the file is modified or relocated.

10. The system of claim 9, wherein the processor is further to:
    determine that the first generation number does not match the second generation number;
    update the first generation number in the initial link in response to the determination that the first generation number does not match the second generation number; and
    retrieve the file from the actual storage location in response to the determination that the first generation number does not match the second generation number.

11. The system of claim 9, wherein the processor is further to:
- determine that the first generation number does not match the second generation number;
- update the first generation number in the initial link in response to the determination that the first generation number does not match the second generation number; and
- generate a notification that indicates the mismatch in response to the determination that the first generation number does not match the second generation number.

12. The system of claim 11, wherein the processor is to update the first generation number in the initial link by replacing the first generation number in the initial link with the second generation number.

13. The system of claim 11, wherein a relocation of the file causes the first generation number to not match the second generation number.

14. The system of claim 11, wherein a modification of the file causes the first generation number to not match the second generation number.

15. The system of claim 9, wherein the processor is to identify the value by utilization of consistent hashing to identify a storage device to which the candidate storage location is allocated.

16. The system of claim 9, wherein the processor is further to:
- determine that the first generation number matches the second generation number; and
- retrieve the file from the actual storage location in response to the determination that the first generation number matches the second generation number.

17. A non-transitory computer-readable storage medium having instructions stored thereon that, when executed by a processor, cause the processor to perform operations comprising:
- receiving, by the processor at a requesting entity, a request to access a file in a cloud-based network, wherein the request comprises an identifier of the file;
- identifying a value in a hash structure at the requesting entity using the identifier of the file as a key into the hash structure, wherein the value comprises an initial link to a candidate storage location of the file in the cloud-based network, and wherein the initial link comprises a first generation number;
- following the initial link to the candidate storage location in the cloud-based network, wherein the candidate storage location in the cloud-based network comprises an additional link;
- following the additional link to an actual storage location of the file in the cloud-based network to access the file and examine a second generation number associated with the file;
- updating the initial link in the value in the hash structure to point to the actual storage location of the file;
- comparing the first generation number to the second generation number to determine whether the file has been relocated or modified by an entity other than the requesting entity; and
- wherein the first generation number and the second generation number are counters that are incremented as the file is modified or relocated.

18. The non-transitory computer-readable storage medium of claim 17, wherein the operations further comprise:
- determining that the first generation number does not match the second generation number;
- updating the first generation number in the initial link in response to determining that the first generation number does not match the second generation number; and
- generating a notification indicating the mismatch in response to determining that the first generation number does not match the second generation number.

* * * * *